United States Patent
Bezbaruah et al.

(10) Patent No.: US 7,054,960 B1
(45) Date of Patent: May 30, 2006

(54) SYSTEM AND METHOD FOR IDENTIFYING BLOCK-LEVEL WRITE OPERATIONS TO BE TRANSFERRED TO A SECONDARY SITE DURING REPLICATION

(75) Inventors: Angshuman Bezbaruah, Pune (IN); Milind Borate, Pune (IN); Basant Rajan, Pune (IN)

(73) Assignee: VERITAS Operating Corporation, Mountain View, CA (US)

( * ) Notice: Subject to any disclaimer, the term of this patent is extended or adjusted under 35 U.S.C. 154(b) by 237 days.

(21) Appl. No.: 10/716,092

(22) Filed: Nov. 18, 2003

(51) Int. Cl.
*G06F 13/00* (2006.01)
*G06F 12/16* (2006.01)

(52) U.S. Cl. .................. 710/33; 711/114; 711/161; 711/162

(58) Field of Classification Search .............. 710/33; 711/162, 161, 114
See application file for complete search history.

(56) References Cited

U.S. PATENT DOCUMENTS

| | | | |
|---|---|---|---|
| 5,875,478 A * | 2/1999 | Blumenau | 71/162 |
| 6,460,123 B1 * | 10/2002 | Blumenau | 711/162 |
| 2003/0074378 A1 | 4/2003 | Midgley et al. | 707/204 |
| 2004/0243775 A1 * | 12/2004 | Coulter et al. | 711/162 |

* cited by examiner

*Primary Examiner*—Tammara Peyton
(74) *Attorney, Agent, or Firm*—Campbell Stephenson Ascolese LLP; Brenna A. Brock (57) ABSTRACT

A method involves generating a block-level write operation, which causes a value to be written to a primary volume, and generating information indicative of whether any of the block-level write operation should be transferred to a secondary site during replication of data in the primary volume. The information can indicate that all, part, or none of the block-level write operation should be transferred to the secondary site. If the information indicates that less than all of the block-level write operation should be transferred to a secondary site, the information can also indicate that logical information associated with the block-level write operation should be transferred to the secondary site instead of transferring the value being written by the block-level write operation.

20 Claims, 5 Drawing Sheets

SYSTEM AND METHOD FOR IDENTIFYING BLOCK-LEVEL WRITE OPERATIONS TO BE TRANSFERRED TO A SECONDARY SITE DURING REPLICATION

FIELD OF THE INVENTION

This invention relates to data processing systems and, more particularly, to block-level replication of file system or application data.

BACKGROUND

Data replication is a technique used to maintain copies of data at separate locations. For example, data can be replicated on several different sites within a corporation's campus and/or on several different ones of the corporation's campuses. If the data is replicated at different sites, and if the failure of the systems storing the data at one site is unlikely to cause the failure of the corresponding systems at another site, replication can provide increased data reliability. Thus, if a disaster occurs at one site, an application that uses that data can be restarted using a replicated copy of the data at another site.

Replication can be performed on data volumes by designating one volume as the primary volume. One or more secondary volumes are then synchronized with the primary volume. These secondary volumes can each be located at a different secondary site. Initially, a secondary volume can be synchronized to the primary volume by copying all of the data on the primary volume to the secondary volume. The data on the primary volume can be copied to the secondary volume by transferring all the data over the network, by creating a backup of the primary volume and restoring the secondary volume from the backup, or by attaching one or more mirrors of the primary volume to the secondary volume. Replication then continues by propagating any changes to data in the primary volume to the secondary volumes.

Most data replication techniques require large amounts of data to be transferred over the network that links the primary site to the secondary site(s). Thus, replication can increase network congestion and possibly lead to decreased network performance. Additionally, if synchronous replication is being performed (i.e., if an application-initiated write does not complete until the new value being written by that write has been transferred across the network), the time taken to transfer data across the network can significantly increase write latency. This increase in write latency can negatively impact application performance. Accordingly, it is desirable to reduce the amount of network traffic due to data replication.

SUMMARY

Various embodiments of systems and methods are disclosed for generating information associated with a block-level write operation and using the associated information to determine whether any of that block-level write operation should be transferred to a secondary site during replication of data in the primary volume. For example, if the block-level write operation modifies metadata that can be regenerated from existing metadata on a secondary volume at the secondary site, the associated information can indicate that none of the block-level write operation should be transferred. In at least some such systems and methods, less than all of certain block-level write operations are transferred to the secondary site during replication, thereby reducing the amount of network traffic due to replication.

In one embodiment, a method involves generating a block-level write operation and generating information indicative of whether any of the block-level write operation should be transferred to a secondary site during replication of data in a primary volume. The block-level write operation causes a value to be written to the primary volume. The block-level write operation and the information can be generated by an application such as a file system. The information can indicate that all, part, or none of the block-level write operation should be transferred to the secondary site. If the information indicates that less than all of the block-level write operation should be transferred to a secondary site, the information can also indicate that logical information associated with the block-level write operation should be transferred to the secondary site (e.g., instead of transferring the value being written by the block-level write operation). Program instructions implementing such a method can be stored upon a computer readable medium.

In another embodiment, a method involves: receiving a block-level write operation to a primary volume and information associated with the block-level write operation, and, in response to the associated information, determining that less than all of the block-level write operation should be transferred to a secondary site during replication of data in the primary volume. Based on this determination, less than all of the block-level write operation is transferred to the secondary site.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

An application, such as a file system, generates block-level write operations to a volume. The file system or other application also generates associated information indicative of whether a given block-level write operation to a primary volume needs to be transferred to a secondary site during replication of data in the primary volume. This associated information allows a virtualization component and/or a replicator to determine whether any of the block-level operation needs to be transferred across a network to the secondary site during replication. Without the associated information, the replicator and/or virtualization component would not have enough information about the type of information being modified by a given block-level operation and/or the function being performed by that block-level write operation to be able to determine whether a given block-level operation needed to be transferred across the network, and thus the replicator would transfer all of each block-level write operation to the secondary site. Accordingly, when the file system or application that is generating the block-level write operations provides this associated information, at least some data transfers across the network linking the primary and secondary site(s) may be eliminated during replication.

Figure 1:
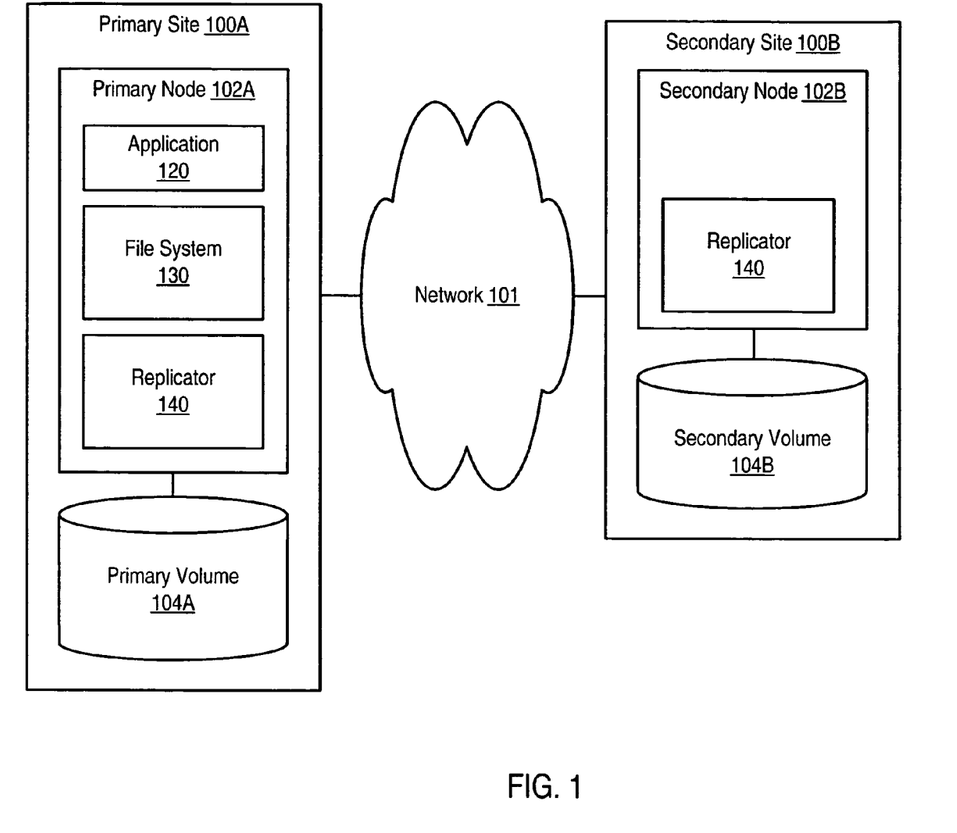
FIG. 1 shows a system that replicates data from a primary site to a secondary site, according to an embodiment of the present invention.

FIG. 1 shows a system that includes a primary site 100A and a secondary site 100B coupled by a network 101. Network 101 can include a WAN (Wide Area Network), such as the Internet, one or more LANs (Local Area Networks), and/or one or more SANs (Storage Area Networks). Primary site 100A includes one or more primary nodes, including primary node 102A, and one or more primary volumes, including primary volume 104A. Primary node 102A implements the functionality of one or more applications 120, file system 130, and replicator 140. Data on primary volume 104A is accessed by application 120 via file system 130. Secondary site 100B includes one or more secondary nodes, including secondary node 102B, and one or more secondary volumes, including secondary volume 104B. Secondary node 102B implements the functionality of replicator 140. Replicator 140 replicates all or part of the data in primary volume 104A to secondary volume 104B.

Primary node 102A and secondary node 102B (collectively, nodes 102) can each include one or more computing devices configured to execute software implementing application 120, file system 130, and/or replicator 140. In such embodiments, nodes 102 can each be or include a workstation, personal computer, server, PDA (Personal Digital Assistant), cell phone, storage network switch, storage device, storage array controller, or any other device configured to execute software implementing application 120, file system 130, and/or replicator 140. Alternatively, each node 102 can be implemented as a logic device configured to perform the functions of application 120, file system 130, and/or replicator 140. Nodes 102 can also be implemented using logic devices that are configured to perform some of the functions of application 120, file system 130, and/or replicator 140 and that are also configured to execute software implementing other functions of application 120, file system 130, and/or replicator 140.

Replicator 140 replicates all or part of the data included in primary volume 104A to one or more secondary volumes (for simplicity, only one such secondary volume 104B is illustrated). Replicator 140 is implemented as a clustered application in some embodiments (e.g., several nodes each implement an instance of replicator 140, and each instance coordinates certain activities with the other instances). Replicator 140 can be either in-band (e.g., replicator 140 can implemented in the data path of data being written to primary volume 104A) or out-of-band (e.g., replicator 140 can sit outside the data path and monitor operations sent to primary volume 104A via the data path). In some embodiments, replicator 140 is implemented using logic included in and/or software executing on a hardware array controller, which in turn controls a storage array on which primary volume 104A is implemented.

Replicator 140 can be implemented as part of a storage virtualization component such as VERITAS Volume Manager™. A storage virtualization component, which can be implemented in hardware, software, or a combination of the two, creates and manages one or more logical storage devices, called volumes, such as primary volume 104A and secondary volume 104B. Applications such as databases and file systems view and access the logical volumes managed by the storage virtualization component in the same way that the applications would view and access physical storage devices.

Each data volume 104A and 104B can be implemented on one or more physical storage devices. A physical storage device can be a single device (e.g., a single hard drive, CD (Compact Disc) drive, or DVD (Digital Versatile Disc) drive). Alternatively, a storage device can include an array of such devices (e.g., a RAID array of several hard drives controlled by a hardware array controller). Also, portions of more than one data volume can be implemented on the same physical storage device. In some embodiments, there are multiple secondary volumes 104B (or replication volume groups) to which replicator 140 replicates data in primary volume 104A (or a primary replication volume group). Identical replication operations are typically performed to all secondary volumes.

While FIG. 1 illustrates a system configured to replicate data in a single data volume, other embodiments support replication of multiple data volumes. For example, file system 130 can access data on multiple volumes. File system 130 can store file data on one volume and file metadata on one or more other volumes. In one embodiment, different types of metadata (e.g., inodes, intent log metadata, and the like) are each stored on a different volume. In embodiments in which file system 130 accesses multiple volumes, replicator 140 replicates data stored on all of the volumes accessed by the file system to one or more volumes at secondary site 100B.

Primary volume 104A is typically organized into logical blocks (these logical blocks can be blocks within a logical volume created by a storage virtualization component or blocks within a physical volume). Accesses to the volume are addressed to these blocks. File system 130 organizes data stored on primary volume 104A into one or more files by storing metadata identifying which block(s) store each of the files. For example, the metadata associated with a particular file can identify the starting LBA (Logical Block Address) and size (in number of blocks) of each portion of that file. File system 130 uses this metadata when accessing each file.

File system 130 generates block-level operations to primary volume 104A. A block-level operation includes a command (e.g., read or write), addressing information identifying the block(s) to be operated on by the command, and, if a write command is specified, the new value of the data being written. These block-level operations can be generated in response to application 120 initiating an access to data stored on primary volume 104A. For example, if application 120 writes to a file, file system 130 translates the write into one or more block-level write operations that are addressed to logical blocks within primary volume 104A. Block-level operations can also be generated as part of various file system activity. For example, file system 130 can periodically generate a checkpoint representing a point-in-time copy of file data and/or metadata managed by file system 130. Generating a checkpoint involves generating one or more block-level write operations to primary volume 104A. As another example, file system 130 can maintain a data cache (e.g., in memory on primary node 102A) and perform I/O operations to this data cache. When data is flushed from the cache (e.g., because that data is selected for replacement by a cache replacement algorithm), file system 130 generates one or more block-level write operations to write that data from the cache to primary volume 104A.

For block-level write operations (i.e., block-level operations that modify data within primary volume 104A), file system 130 generates associated information indicating whether any of the block-level write operation should be transferred to secondary site 100B via network 101. In one embodiment, the associated information is used to select one of several options for a given block-level write operation: transfer all of the block-level write operation, transfer none of the block-level write operation, or transfer less than all of the block-level write information. Replicator 140 (or a storage virtualization component) receives this associated information and uses it to determine whether to transfer any of the block-level write operation across network 101 to secondary site 100B.

File system 130 can generate the associated information based on the type of data (e.g., file data, metadata, checkpoint data, and the like) being modified by the block-level write operation and based on whether the new value of the data being modified is already available at the secondary site. Certain types of metadata, referred to herein as correctable metadata, can be generated from other metadata and/or checkpoints maintained by file system 130 (e.g., by using a file system checker (fsck) utility, by replaying a log, and/or by comparing different checkpoints and regenerating the correctable metadata based on the differences between the compared checkpoints). Thus, as long as the other metadata and/or checkpoints are already available at the secondary site, the correctable metadata can be generated at secondary site 100B by a local instance of file system 130 on that site. Accordingly, whenever a block-level write operation to modify correctable metadata is generated, file system 130 can also generate associated information indicating that none of that write operation needs to be transferred to secondary site 100B. In contrast, if non-correctable metadata is modified by a write operation, file system 130 generates associated information indicating that all (or at least part, as described below) of that block-level write operation should be transferred to secondary site 100B.

As another example, certain types of file system activity involve moving data from one portion of the file system space on primary volume 104A to another portion. For example, file system 130 can generate point-in-time images (referred to herein as checkpoints) of at least some of the data and metadata (e.g., the file data and directory hierarchy maintained by the file system) on primary volume 104A using copy-on-write (COW) techniques. Whenever a portion of the file system data is modified, file system 130 transfers its original value to the most recent checkpoint before overwriting that portion of the file system data with a new value. File system 130 implements this transfer by generating one or more block-level read and write operations to primary volume 104A. File system 130 can track which block-level write operations are generated during the transfer. For each of those block-level write operations, file system 130 can generate associated information indicating that the new value of the data included in the block-level write operation does not need to be transferred across network 101. The associated information can also indicate the source address of the portion of the original data being moved to the checkpoint by that block-level write operation. Based on this associated information, replicator 140 can transfer logical information, which identifies the source address, destination address, and/or data length (e.g., in blocks) of the new value, instead of transferring the new value to be written by the block-level write operation across network 101. This logical information can be used (e.g., by an instance of replicator 140 on the secondary site) to perform the appropriate transfer on secondary volume 104B. For example, given the source address, length, and destination address included in the logical information, the instance of replicator 140 at secondary site 100B can read a data value of that length from the source address on secondary volume 104B and write that data value to the destination address on secondary volume 104B. If the logical information identifying the source address, destination address, and/or data length is smaller than the size of the new value of the data being modified, this results in less data being transferred across network 101 while still effectively replicating the changes caused by the block-level write operation to the secondary volume 104B. Similar associated information can be generated for block-level write operations that are part of a file system reorganization. File system reorganization can be performed to reduce file system fragmentation and/or to move one or more files, each of which were previously segmented on primary volume 104A, into contiguous space on primary volume 104A. Since file system 130 is simply rearranging data that is already present at both primary site 100A and secondary site 100B, file system 130 can indicate that logical information identifying a source address, a destination address, and/or data length should be transferred to secondary site 100B instead of transferring the new value of the data being written by a block-level write operation that is performed as part of a file system reorganization.

File system 130 can also consider the characteristics of the block-level write operation (e.g., whether the block-level write operation is actually being performed to modify all of the data addressed by the block-level write operation) when generating the associated information. For example, file system 130 can handle certain types of metadata in constant-sized "chunks" of data. Each constant-sized chunk includes several units of metadata. For example, in one embodiment, inodes are handled in chunks, and each chunk may include up to sixteen inodes (it is noted that chunks of modes can contain different numbers of inodes in other embodiments). File system 130 generates a block-level write operation to all of a given chunk of data whenever it updates any of the units of metadata in that chunk, even if fewer than all of the other units of metadata in that chunk are actually being modified. If fewer than all of the units of metadata are modified by a given block-level write operation to a chunk of metadata, file system 130 can generate associated information indicating which units of metadata within that chunk are actually being modified. In response to this associated information, replicator 140 can transfer the values of the units of metadata actually being modified instead of transferring the entire value of the chunk of metadata across network 101.

File system 130 can provide the associated information to replicator 140 (and/or a storage virtualization component) on an operation-by-operation basis, at certain intervals, and/or in response to the occurrence of certain events. For example, in some embodiments, file system 130 generates associated information for each block-level write operation and appends this associated information to the block-level write operation. In other embodiments, file system 130 provides mapping information to the replicator 140. The mapping information identifies different types of data and/or metadata within primary volume 104A and indicates whether block-level write operations modifying those different types of data and/or metadata should be transferred across network 101. The mapping information can indicate, for example, which extents of primary volume 104A correspond to correctable metadata. In embodiments in which file system 130 stores different types of metadata on different volumes, the mapping information can be generated on a per-volume basis (e.g., the mapping information can indicate that block-level write operations to one volume, which stores an intent log, should be transferred across the network while block-level write operations to another volume, which stores a file change log, should not be transferred across the network). Whenever replicator 140 receives a block-level write operation from file system 130, replicator 140 can access the mapping information to determine whether the block-level write operation modifies correctable metadata. If so, replicator 140 can determine that the block-level write operation should not be transferred across network 101. Whenever file system 130 performs operations that change the mapping information, file system 130 can provide a new version of the mapping information to replicator 140.

While file system 130 is used to generate block-level operations to primary volume 104A in the embodiment of FIG. 1, it is noted that in alternative embodiments, applications such as application 120 are configured to generate block-level operations to primary volume 104A directly, without the involvement of file system 130. In such embodiments, applications other than file systems can also generate associated information indicating whether a block-level write operation should be transferred to a secondary site during replication of a primary volume. Such applications can use similar techniques to those described above with respect to a file system when generating the associated information.

It is noted that in some embodiments, a storage virtualization component (e.g., such as VERITAS Volume Manager™, as mentioned above) can be located between file system 130 (or any other application that generates block-level write operations) and replicator 140. As with replicator 140, the storage virtualization component can be in-band or out-of-band. In embodiments where the storage virtualization component sits between a file system or application and replicator 140 (e.g., if replicator 140 is implemented in a storage array controller), the storage virtualization component can use the information provided by the file system or application (e.g., information associated with each block-level write operation and/or mapping information) to determine whether each block-level write operation should be transferred across network 101. Based on this determination, the storage virtualization component can send all, part, or none of each block-level write operation to replicator 140 for transfer across network 101.

Figure 2A:
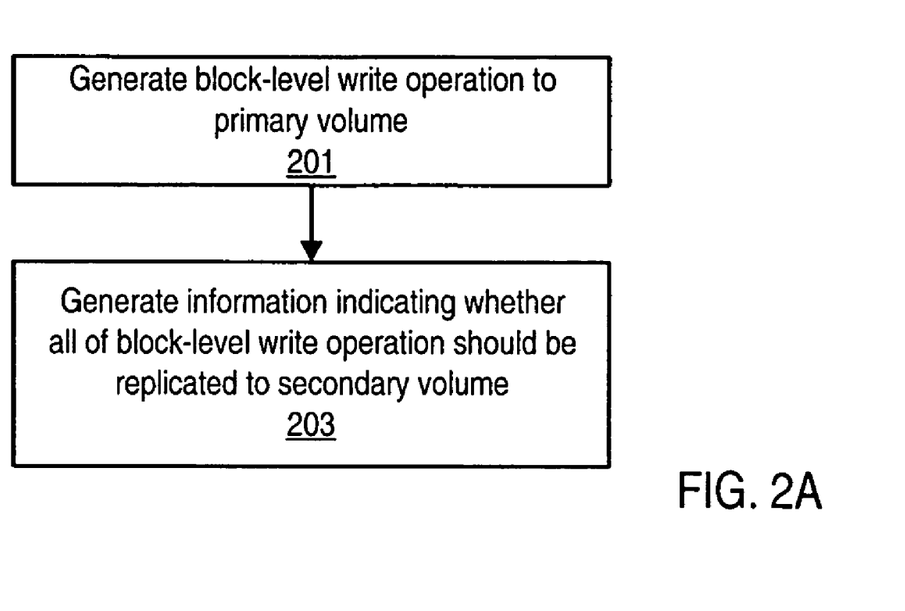
FIG. 2A is a flowchart of a method of generating a block-level write operation and information indicating whether any of the block-level write operation should be transferred across the network during replication, according to an embodiment of the present invention.

FIG. 2A is a flowchart of a method of generating a block-level write operation and information indicating whether any of the block-level write operation should be replicated, according to an embodiment of the present invention. At 201, a block-level write operation is generated to a primary volume. This block-level write operation includes a command, addressing information (e.g., information indicating an extent of the primary volume by a starting address and number of blocks), and the new value of the portion of the primary volume identified by the addressing information. The block-level write operation can be generated by a file system or by an application that is configured to provide block-level write operations and associated information to a storage virtualization component or replicator. If a file system is used, the file system can be an independent application or an integrated component of another application (e.g., a database application or a storage virtualization component).

The block-level write operation can be one of several block-level operations generated to perform a particular function. For example, if a file system is copying data to a COW checkpoint in preparation for performing a write, the file system can generate one or more block-level read operations in order to read the original value of the data that is about to be modified. The file system then generates one or more block-level write operations in order to write the original value(s) to the COW file system checkpoint.

Associated information, which indicates whether any of the block-level write operation should be transferred across a network to a secondary site during replication, is generated at 203. This associated information is also generated by the file system or application that generated that block-level write operation. In some embodiments, this information can be generated on an operation-by-operation basis for each block-level write operation. For example, a file system or application can determine whether all, part, or none of a block-level write operation should be transferred across the network during replication based on the type of data or metadata being modified by the block-level write operation and/or based on the type of file system function of which the block-level operation is a part. The file system or application can then generate the associated information for each block-level write operation based on the outcome of this determination. Alternatively, a file system or application can perform function 203 by generating (or updating) mapping information that identifies various regions of primary volume 104A and indicates whether any of a block-level write operation addressed to any one of those regions should be transferred across the network during replication.

If the associated information indicates that only part of the block-level write operation should be transferred across the network, the information generated at 203 can also indicate which portions of the block-level write operation should be transferred across the network and/or indicate alternative information to transfer across the network instead of a given portion of the block-level write operation. For example, if the block-level write operation addresses a sixteen-node chunk of modes but is only being performed to modify a single inode within that sixteen-node chunk, the file system can generate associated information indicating that only part of the block-level write operation should be transferred across the network during replication. The file system can also generate logical information, including addressing information (e.g., specifying one or more pairs of offsets and lengths) identifying the single inode being modified within the chunk should be transferred across the network instead of or in addition to transferring the addressing information included in the block-level write operation, which identifies the entire sixteen-inode chunk. Similarly, if the file system generates a block-level write operation in order to move data from one portion of the primary volume to another (e.g., to update a checkpoint or as part of file system reorganization), the file system can generate logical information indicating the source address from which the new value of the data being modified by the block-level write operation can be obtained, the destination address to which the new value should be written, and the length (e.g., in blocks or bytes) of the new value.

In some embodiments, function 203 is performed at substantially the same time as the performance of function 201 (e.g., if function 203 is performed for each block-level write operation). In other embodiments, function 203 can be performed independently of when function 201 is performed. For example, if function 203 is performed to update mapping information (as described above), function 203 can be repeated each time the mapping information for the file system data is updated.

Figure 2B:
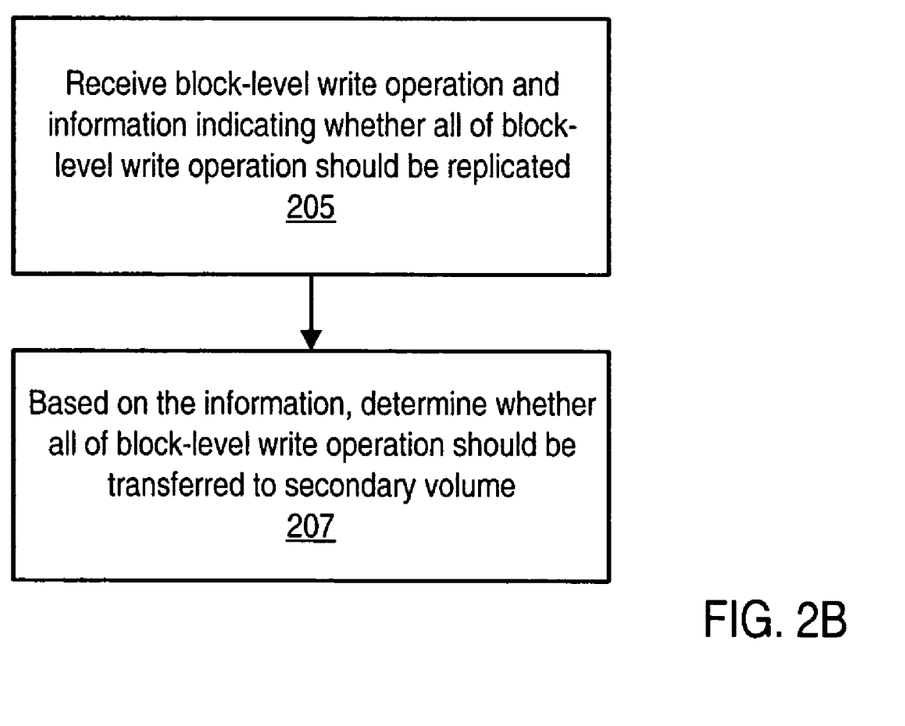
FIG. 2B is a flowchart of a method of using information associated with a block-level write operation to determine whether to transfer any of the block-level write operation across the network during replication, according to one embodiment of the present invention.

FIG. 2B is a flowchart of a method of determining whether any of a given block-level write operation to a primary volume should be transferred across a network to a secondary site during replication, according to one embodiment of the present invention. It is noted that functions 205 and 207 can each be performed by a replicator or a virtualization component, depending on the configuration of the system being used (e.g., if a virtualization component sits between the file system and the replicator, these functions can be performed by the virtualization component, which can then provide the replicator with the portion of the block-level write operation, if any, selected for transfer across the network).

At 205, a block-level write operation and associated information, which indicates whether any of the block-level write operation should be transferred across the network, is received. It is noted that the block-level write operation can be received at a different time than the associated information indicating whether any of the block-level write operation should be transferred across the network. Additionally, the associated information that indicates whether any of the block-level write operation should be transferred across the network can correspond to multiple different block-level write operations in some embodiments. Indicating whether any of a block-level write operation should be transferred across the network can be performed directly (e.g., the information can be appended to a block-level write operation and indicate whether all, none, or part of that particular block-level write operation should be transferred across the network) or indirectly (e.g., the information can be provided as mapping information that identifies regions of the primary volume and indicates whether a block-level write operation modifying one of those regions should be transferred across the network).

At 207, a determination is made as to whether to transfer any of the block-level write operation across the network. This determination depends on the associated information. For example, if the associated information includes mapping information, the addressing information included in the block-level write operation is compared to the mapping information to determine which region of the primary volume is being modified by the block-level write operation. The determination is then made based on whether the mapping information indicates that no portion of a block-level write operation that addresses that region should be transferred across the network.

Figure 3:
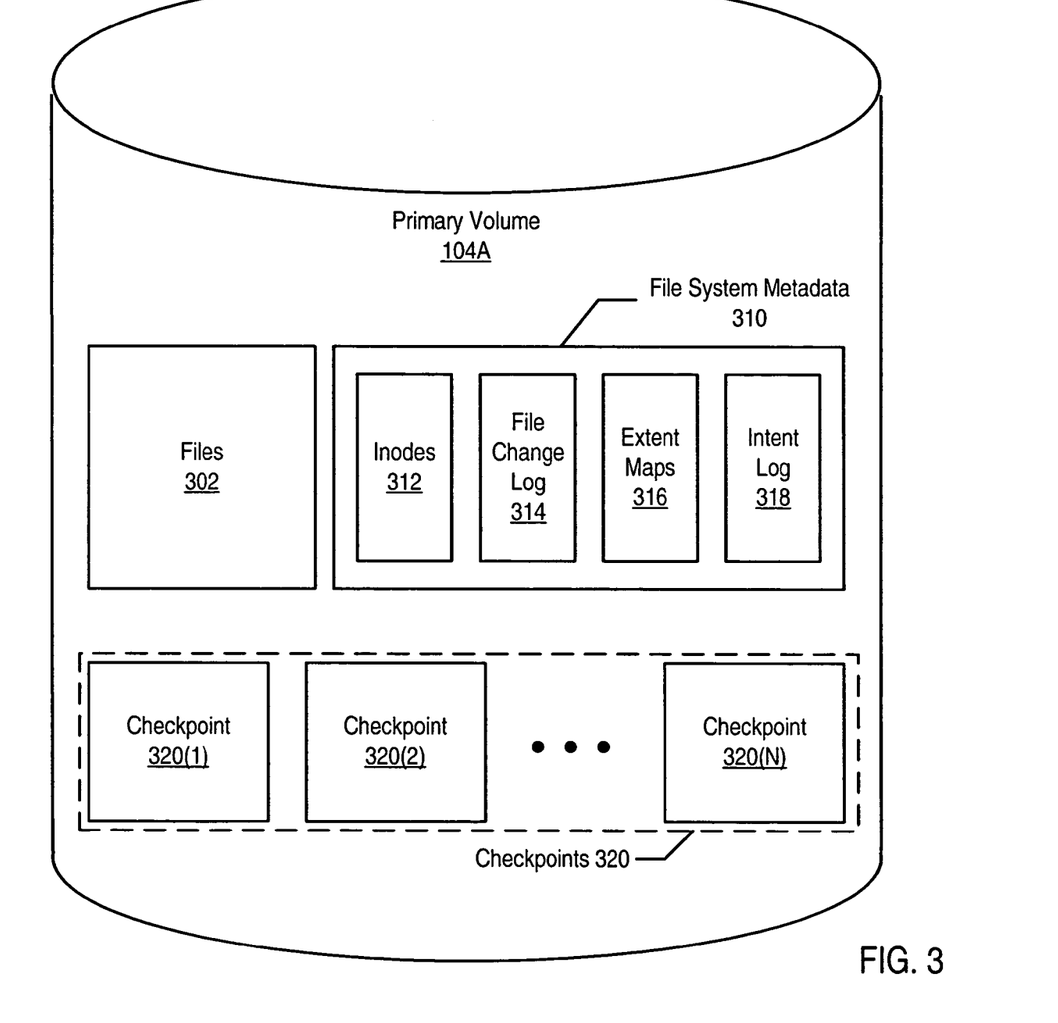
FIG. 3 illustrates the different types of data that be stored in a storage volume, according to an embodiment of the present invention.

FIG. 3 illustrates an example of the different types of data that can be stored in a storage volume, according to an embodiment of the present invention. In FIG. 3, primary volume 104A stores one or more files 302 and file system metadata 310. File system metadata 310 includes one or more inodes 312, file change log 314, extent map 316, and intent log 318. Primary volume 104A also stores one or more checkpoints 320. Checkpoints 320 include N checkpoints 320(1) through 320(N). Each checkpoint 320(1) through 320(N) represents a point-in-time copy of files 302 and at least a portion of file system metadata 310 (e.g., in one embodiment, inodes 312 are included in each checkpoint but intent log 318 is not). It is noted that, although each different type of data is shown separately in FIG. 3, the different types of data may actually be intermingled on the physical storage device(s) on which primary volume 104A is implemented. It is also noted that not all embodiments will include all of the different types of data shown in FIG. 3, and that some embodiments will include different types of data in addition to and/or instead of those data types shown here.

Files 302, file system metadata 310, and checkpoints 320 are managed by a file system (e.g., file system 130 in FIG. 1). The file system stores user data generated and used by an application (e.g., application 120 in FIG. 1) in one or more files 302. Files 302 are also used to maintain the hierarchy of files. For example, a directory file stores information identifying other files that are located 'within' that directory. In some embodiments, all block-level write operations that address regions of primary volume 104A that are used to store files 302 are indicated as needing to be transferred across the network during replication.

Inodes 312 are used to track the actual location of each file within primary volume 104A. Each file has an associated inode that indicates various properties associated with that file as well as the location of the file within primary volume 104A. In some embodiments, block-level write operations that modify inodes 312 are indicated as needing to be transferred across the network during replication. However, in systems that handle inodes in chunks, the file system can indicate that only a portion of a block-level write operation, which is generated to modify fewer than all of the inodes in a particular chunk, needs to be transferred across the network, as described above. In alternative embodiments, inodes 312 are considered to be correctable metadata (e.g., in embodiments that use an intent log as described below) and block-level write operations that modify modes 312 are not transferred across the network.

File change log 314 records changes to files 302. For example, each time a file 302 is modified, the file system can update file change log 314. The information in the file change log can indicate which file was modified, the offset within that file of the portion of the file being modified, the time at which the modification occurred, the number of bytes written to the file, and the new value of the portion of the file being modified.

File change log 314 is an example of correctable metadata that can be recreated on the secondary site. For example, in some embodiments, a second instance of the file system is implemented on the secondary site. This file system can monitor block-level operations that are received, via the network, from the replicator on the primary site. The file system on the secondary site can generate appropriate entries in its local file change log. Since file change log 314 can be recreated on the secondary site, the file system on the primary site can generate information indicating that a block-level write operation(s) that modifies file change log 314 does not need to be transferred over the network to the secondary site.

Extent map 316 identifies the portions of primary volume 104A that are currently unallocated. The file system uses extent map 316 when allocating extents of primary volume 104A for the storage of files 302, file system metadata 310, and checkpoints 320. A file system checker included in the file system can regenerate the extent map by examining each of inodes 302 to identify currently allocated regions of primary volume 104A. Since extent map 316 can be recreated at the secondary site from modes 302 stored at the secondary site, extent map 316 is an example of correctable metadata. Accordingly, in some embodiments, block-level write operations that modify extent map 316 are not transferred across the network during replication.

Intent log 318 records changes to certain types of file system metadata 310. For example, all write activity to modify inodes 312 and extent map 316 can be logged in intent log 318. Thus, in embodiments that use intent log 318 to track changes to inodes 312 and extent map 316, block-level write operations modifying intent log 318 are transferred across the network to the secondary site while block-level write operations modifying inodes 312 and extent map 316 are not transferred across the network. Changes to modes 312 and extent map 316 can be applied to the secondary volume by applying each change identified in the secondary site's copy of the intent log.

As shown in FIG. 3, many types of correctable metadata can be recreated on the secondary site. It is noted that correctable metadata can be recreated on-the-fly, periodically, or upon failover to the secondary site. For example, some metadata, such as file change log 314, can be recreated on-the-fly. Similarly, a file system on the secondary site can periodically recreate correctable metadata from information stored in intent log 318. As another example, in some embodiments, block-level write operations modifying inodes 312 are transferred across the network while block-level write operations modifying extent map 316 are not. Upon failover to the secondary site, a file system on the secondary site can run a file system checker to recreate extent map 316 from inodes 312 stored on the secondary volume.

Figure 4:
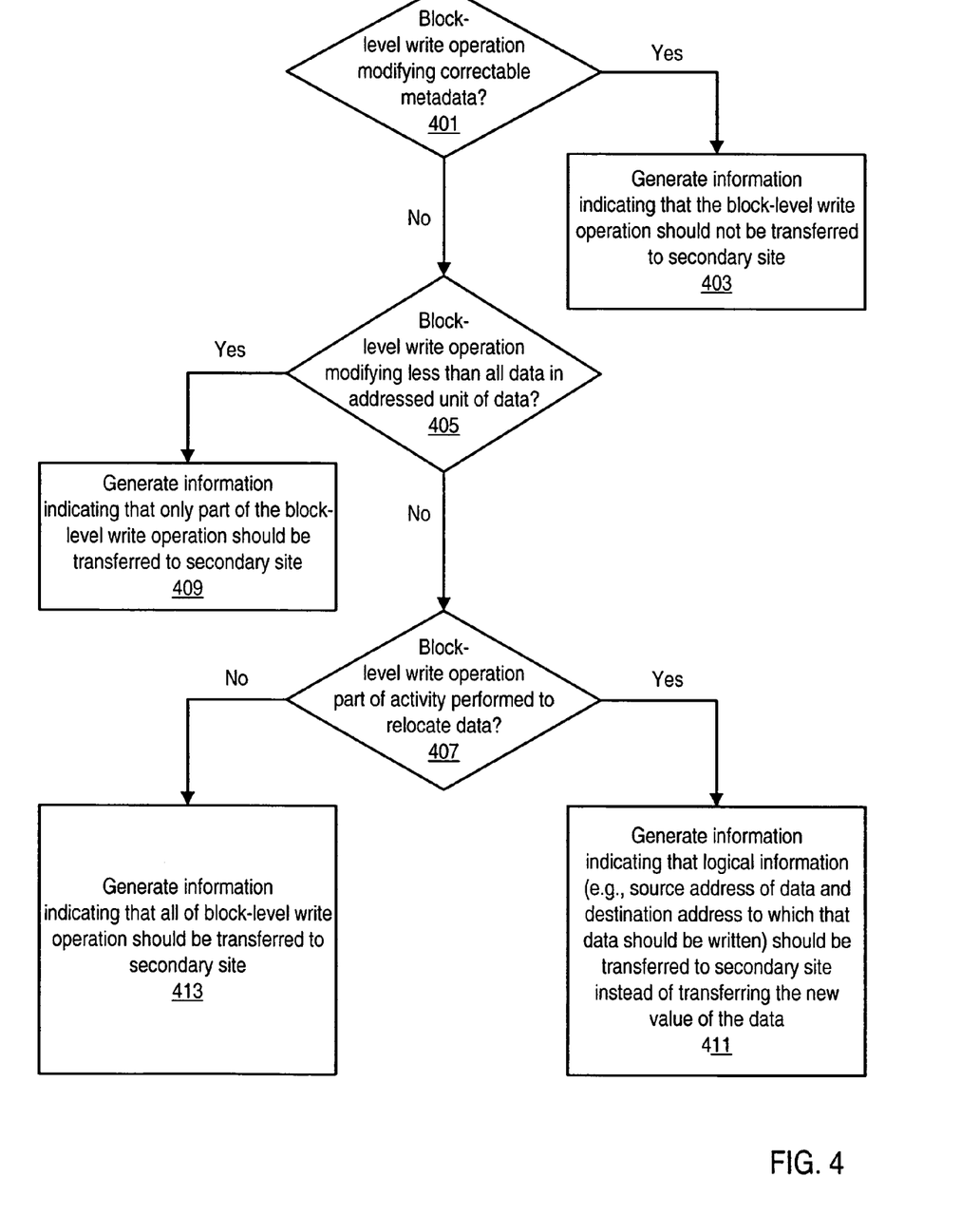
FIG. 4 shows how different associated information is generated depending on the type of data being modified by a block-level write operation and/or the type of activity of which the block-level write operation is a part.

FIG. 4 shows how a file system or application can generate different associated information for a given block-level operation depending on the type of data being modified and/or the type of activity of which the block-level write operation is a part. At 401, it is determined whether a given block-level write operation is modifying correctable metadata. Correctable metadata can include metadata such as a file change log, an extent list, and/or any metadata for which all modifications are tracked in an intent log (such metadata can be recreated on the secondary site by transferring all block-level write operations that modify the intent log across the network and then replaying the intent log on the secondary site). Correctable metadata is metadata that can be recreated on the secondary site either by monitoring other accesses to the secondary volume or by deriving the correctable metadata from other metadata (e.g., by running a file system checker during failover to the secondary volume). As indicated at 403, associated information, which indicates that the block-level write operation should not be transferred across the network, is generated if it is determined that the block-level write operation modifies correctable metadata. Otherwise, additional determinations about the block-level write operation can be made at 405 and/or 407.

At 405, it is determined whether the block-level write operation is modifying less than all of the data in an addressed unit (or group of units) of data or metadata. If so, associated information is generated, as shown at 409, which indicates that less than all of the block-level write operation should be transferred across the network. In some embodiments, the associated information indicates that only the new value(s) of the portion(s) of the addressed unit of data actually being modified (as opposed to the new value of the entire addressed unit of data) should be transferred across the network. The associated information can also indicate that logical information identifying the modified portion of the unit of data within that unit of data (e.g., by specifying a block address and an offset within the addressed block) should be transferred across the network.

In some embodiments, the determination at 405 is performed for block-level writes that modify certain types of metadata (e.g., inodes). In other embodiments, this determination can be performed for all block-level writes. For example, if the block-level write operation that addresses a 512-byte block is being performed to modify a single byte within that block, associated information, which indicates that logical information identifying the single byte within the addressed block and the new value of that single byte should be transferred across the network instead of transferring the entire value of the 512-byte block across the network, can be generated.

At 407, it is determined whether the block-level write operation is being generated as part of file system activity that relocates data from one location within the primary volume to another, as indicated at 411. If so, associated information is generated to indicate that logical information should be transferred across the network instead of transferring the new value of the data modified by the block-level write operation. The logical information can identify the source address of the new value of the data being modified by the block-level write operation. File system activity that relocates data from one location to another includes file system reorganization and write to move data to a COW file system checkpoint.

If a block-level write operation does not modify correctable metadata, is not modifying less than all of an addressed unit of data and/or metadata, or is not generated as part of file system activity to relocate data, associated information for that block-level write operation can indicate that the entire block-level write operation should be transferred across the network to the secondary site, as indicated at 413. It is noted that the determinations 401, 405, and 407 shown in FIG. 4 can be performed in various different orders instead of the order illustrated in FIG. 4. Additionally, in some embodiments, the various determinations 401, 405, and 407 shown in FIG. 4 are performed at substantially the same time.

Additional criteria can be used to make determinations instead of and/or in addition to the criteria used in determinations 401, 405, and 407 of FIG. 4. For example, it may not be necessary to replicate some types of metadata to the secondary site in order to be able to failover to the secondary site (e.g., those types of metadata can provide increased performance and/or reliability but not be absolutely necessary to be able to access the files on the secondary site). Such metadata is referred to herein as nonessential metadata. File change log 314 (as shown in FIG. 3) is an example of nonessential metadata. Another example of nonessential metadata is metadata included in a search index used to improve file system performance when handling large directories. If a block-level write operation modifies one of these non-essential types of metadata, a file system can generate associated information indicating that none of that block-level write operation should be transferred to the secondary site.

It is noted that some types of metadata can be described as both correctable and nonessential. Furthermore, some types of metadata can be characterized as correctable in some circumstances and non-correctable in others. For example, inodes can be treated as correctable metadata if writes to the intent log are always transferred across the network. If an intent log is not used, however, or if the intent log is treated as nonessential metadata, inodes may not be correctable, and thus in embodiments that lack an intent log or that do not replicate the intent log, block-level writes to inodes may always be transferred across the network during replication. Thus, different embodiments can generate associated information for these different types of metadata differently. Additionally, some embodiments continue to transfer block-level write operations to certain types of metadata across the network, even though those types of metadata could be treated as correctable and/or nonessential. For example, in one embodiment, block-level write operations to both inodes and the intent log are transferred across the network during replication (even though the inodes could be treated as correctable metadata in that situation).

Figure 5:
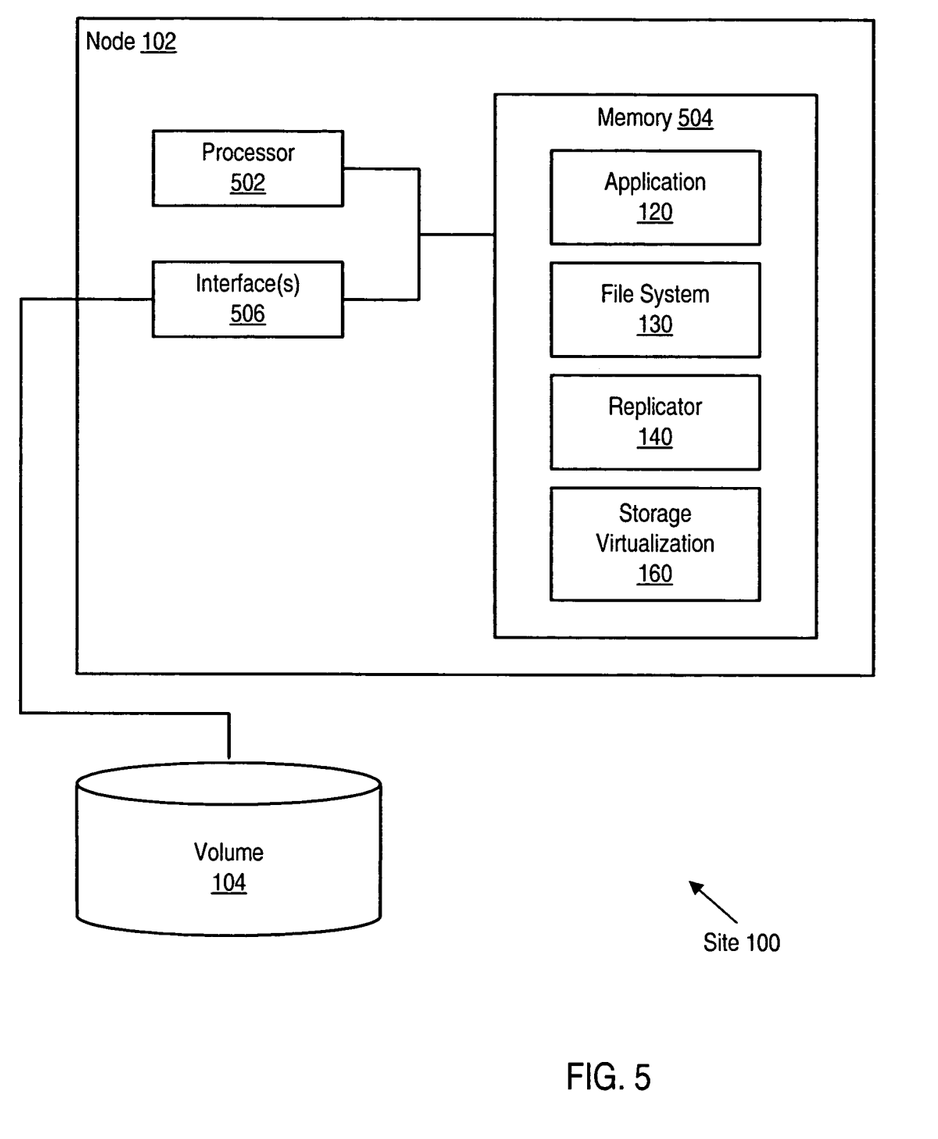
FIG. 5 is a block diagram of a site that can be involved in replication, according to an embodiment of the present invention.

FIG. 5 is a block diagram of a site 100 (e.g., site 100A or 100B in FIG. 1) that can be involved in replication, according to an embodiment of the present invention. FIG. 5 illustrates how application 120, file system 130, replicator 140, and/or storage virtualization component 160 can be implemented in software. As illustrated, node 102 includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Node 102 also includes one or more interfaces 506. Processor 502, interface 504, and memory 506 are coupled to send and receive data and control signals by a bus or other interconnect.

Interface(s) 506 can include network interfaces to various networks and/or interfaces to various peripheral buses. Interface(s) 506 can include an interface to one or more storage devices on which data volume 104 (e.g., primary volume 104A or secondary volume 104B, as shown in FIGS. 1 and 4) is implemented, as shown in FIG. 5. Interface(s) 506 can also include an interface to network 101 (as shown in FIG. 1), for use in communicating with a node at another site when performing replication of data to or from that site.

The program instructions and data implementing application 120, file system 130, replicator 140 and/or storage virtualization component 160 can be stored on various computer readable media such as memory 504. In some embodiments, such software is stored on a computer readable medium such as a CD (Compact Disc), DVD (Digital Versatile Disc), hard disk, optical disk, tape device, floppy disk, and the like). In order be executed by processor 502, the instructions and data implementing volume replicator 130 and application 120 are loaded into memory 504 from the other computer readable medium. The instructions and/or data implementing can also be transferred to node 102 for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and instructions implementing application 120, file system 130, replicator 140, and/or storage virtualization component 160 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method, comprising:
generating a block-level write operation, wherein the block-level write operation causes a value to be written to a region of a primary volume;
identifying whether the region of the primary volume stores a first type of a plurality of types of file system metadata; and
generating information indicative of whether any of the block-level write operation should be transferred to a secondary site during replication of data in the primary volume, wherein if the region of the primary volume stores the first type of file system metadata, the information identifies that less than all of the block-level write operation should be transferred to the secondary site.

2. The method of claim 1, wherein
the block-level write operation and the information are generated by a file system.

3. The method of claim 1, wherein
the information indicates that the block-level write operation should not be transferred to the secondary site.

4. The method of claim 3, wherein
the block-level write operation modifies correctable metadata.

5. The method of claim 3, wherein
the block-level write operation modifies non-essential metadata.

6. The method of claim 1, wherein
the information indicates that less than all of the block-level write operation should be transferred to the secondary site.

7. The method of claim 6, wherein
the information indicates that logical information associated with the block-level write operation should be transferred to the secondary site instead of transferring the value, and
the logical information identifies a source address, from which to read the value, and a length of the value.

8. The method of claim 7, further comprising:
reading the value from the source address on a secondary volume comprised in the secondary site; and
writing the value to the destination address on the secondary volume.

9. The method of claim 6, wherein
the block-level write operation is being performed to modify fewer than all units of metadata in a group of metadata addressed by the block-level write operation, and
the information indicates that new values of only certain units of metadata in the group of metadata should be transferred to the secondary site.

10. The method of claim 9, further comprising:
transferring less than all of the block-level write operation to the secondary site; and updating only the certain units of metadata on a secondary volume comprised in the secondary site.

11. The method of claim 1, further comprising
receiving the block-level write operation and the information; and
transferring less than all of the block-level write operation to the secondary site in response to the information.

12. A system comprising:
a processor; and
a memory coupled to the processor, wherein the memory stores program instructions executable by the processor to:
generate a block-level write operation, wherein the block-level write operation causes a value to be written to a region of a primary volume,
identify whether the region of the primary volume stores a first type of a plurality of types of file system metadata, and
generate information indicative of whether all of the block-level write operation should be transferred to a secondary site during replication of data in the primary volume, wherein if the region of the primary volume stores the first type of file system metadata, the information identifies that less than all of the block-level write operation should be transferred to the secondary site.

13. The system of claim 12, wherein
the information indicates that none of the block-level write operation should be transferred to the secondary site.

14. The system of claim 12, wherein
the information indicates that less than all of the value should be transferred to the secondary site.

15. A computer readable medium comprising program instructions executable to:
generate a block-level write operation, wherein the block-level write operation causes a value to be written to a region of a primary volume,
identify whether the region of the primary volume stores a first type of a plurality of types of file system metadata, and
generate information indicative of whether all of the block-level write operation should be transferred to a secondary site during replication of data in the primary volume, wherein if the region of the primary volume stores the first type of file system metadata, the information identifies that less than all of the block-level write operation should be transferred to the secondary site.

16. The computer readable medium of claim 15, wherein
the information indicates that none of the block-level write operation should be transferred to the secondary site.

17. The computer readable medium of claim 15, wherein
the information indicates that less than all of the value should be transferred to the secondary site.

18. A system comprising:
means for generating a block-level write operation, wherein the block-level write operation causes a value to be written to a region of a primary volume,
means for identifying whether the region of the primary volume stores a first type of a plurality of types of file system metadata, and
means for generating information indicative of whether all of the block-level write operation should be transferred to a secondary site during replication of data in the primary volume, wherein if the region of the primary volume stores the first type of file system metadata, the information identifies that less than all of the block-level write operation should be transferred to the secondary site.

19. The method of claim 1, further comprising:
identifying whether the block-level write operation is being performed to move the value from a first region of the primary volume to a second region of the primary volume; wherein if the block-level write operation is being performed to move the value, the information identifies that less than all of the block-level write operation should be transferred to the secondary site.

20. The method of claim 1, further comprising:
identifying whether the block-level write operation modifies less than all of the region of the primary volume; wherein if the block-level write operation modifies less than all of the region, the information identifies that less than all of the block-level write operation should be transferred to the secondary site.

* * * * *